United States Patent [19]

Kuo

[11] 4,426,936

[45] Jan. 24, 1984

[54] METHOD AND APPARATUS FOR DISPOSAL OF THERMOPLASTIC WASTE IN A FLUIDIZED BED REACTOR

[75] Inventor: Hong-Hsiang Kuo, Troy, Mich.

[73] Assignee: General Motors Corporation, Detroit, Mich.

[21] Appl. No.: 370,458

[22] Filed: Apr. 21, 1982

[51] Int. Cl.³ .............................................. F23G 7/00
[52] U.S. Cl. ................................... 110/245; 110/221; 110/238; 110/346
[58] Field of Search ............... 110/245, 346, 237, 238, 110/222, 263, 221

[56] References Cited

U.S. PATENT DOCUMENTS 4,177,742  12/1979  Uemura et al. .................. 110/245 X
4,270,469  6/1981   Gall ...................................... 110/245
4,276,835  7/1981   Zeltner ................................ 110/222
4,303,559  12/1981  Trost .................................... 260/2.3
4,308,806  1/1982   Uemura et al. ...................... 110/244

Primary Examiner—Edward G. Favors
Attorney, Agent, or Firm—Elizabeth F. Harasek

[57] ABSTRACT

A fluidized bed reactor suitable for burning polymeric waste material, particularly thermoplastics, has been developed as well as a method of using it. The reactor comprises a chamber for retaining a fluidized bed of refractory particles and burning the polymer therein. A specially adapted diffuser plate located at the bottom of the reactor controls the flow path of particles in the fluidized bed to enhance mixing and maintain uniform reactor temperatures. Means are additionally provided to introduce polymer particles into the reaction chamber in a controlled manner as well as ignition means to continuously ignite gases in the reactor, promoting the burning reaction. In accordance with the subject method, the bulk of the polymer waste is substantially reduced and useful heat energy is recovered.

7 Claims, 6 Drawing Figures

METHOD AND APPARATUS FOR DISPOSAL OF THERMOPLASTIC WASTE IN A FLUIDIZED BED REACTOR

This invention relates to a method and apparatus for treating themoplastic waste materials in a fluidized bed reactor to greatly reduce its bulk and generate heat energy.

BACKGROUND

Heretofore, non-reclaimable thermoplastic polymeric scrap materials have, for the most part, been disposed of as land fill. As the availability of land fill sites diminishes, the cost of plastic waste disposal in this manner increases.

Polymer waste is generated in many ways. For example, a great amount of thermoplastic paint sludge is collected from paint spray booths. Overspray is first flocculated in a water cascade and then collected as sludge. The sludge is dried and disposed of in sealed containers. Other sources of polymer waste are pure or highly filled thermoplastic injection or compression molded compositions. Molding materials with both thermoplastic and thermosetting constituents are common because such materials cannot be readily reprocessed.

It is well known that most polymers can be burned, and that the burning reaction produces a substantial amount of heat energy. Thus, incineration has been considered as an alternative to solid waste disposal. Incinerating thermoplastics, however, presents a number of serious problems. For example, in conventional incinerators, thermoplastic polymers have a tendency to melt. The molten material inhibits uniform combustion which may cause excess smoke production and incomplete incineration. Moreover, thermoplastic waste materials have a wide range of heating values. For example, a paint sludge having a high heating value might produce elevated temperature that could damage a conventional incinerator. If the heating value of a paint sludge is low, the sludge may not burn continuously or completely.

In my search for alternative methods of burning polymer scrap, consideration was given to the use of fluidized bed incinerators. However, conventional fluidized bed incinerators used to burn coal, paper, wood and other such materials are not suitable for incinerating all polymers, particularly thermoplastics. Thermoplastics melt and clog the fluidized bed. Moreover, conventional feeding systems for coal and other nonmeltable fuels are not adaptable to feeding meltable plastic scrap materials. Further, in conventional fluidized beds the burning reaction of the thermoplastics tends to be self extinguishing, i.e., combustion with oxygen cannot be fully sustained within the bed. This may lead to a high concentration of volatile polymer by-products within the reactor and incumbent danger of explosion.

By way of definition, the term pyrolysis herein refers to the degradation of polymeric materials at elevated temperatures in an oxygen deficient atmosphere. The terms incineration and burning refer to the thermal degradation reaction of polymers in the presence of enough oxygen to support combustion of all burnable constituents at suitable elevated temperatures.

OBJECTS

Accordingly, it is an object of the invention to provide a method and apparatus for processing thermoplastic waste material in a fluidized bed reactor to reduce its bulk and recover heat energy. A more particular object is to provide a novel fluidized bed reactor which is adapted to pyrolyze or incinerate polymeric particles, particularly thermoplastics. Another specific object is to burn thermoplastic waste in a continuous, self-sustaining reaction and to recover heat energy generated by the reaction.

Another object of the invention is to provide a specially adapted reactor in which a fluidized bed of refractory particles carries thermoplastic scrap particles in suspension while they are pyrolyzed or incinerated to prevent dripping and clogging and mediate the temperature within the reactor. A further object is to provide a specially adapted distributor plate for admitting fluidizing gases at the bottom of a thermoplastic scrap degradation reactor. The plate configuration creates a circulatory fluid flow pattern within the reactor bed and provides for complete mixing of the refractory carrier particles of the bed and thermoplastic scrap. Another object is to collect the heat energy and reaction products generated by the degradation of thermoplastic scrap in such fluidized bed reactor.

A more specific object of the invention is to provide a method and means for disposing of paint sludge by pyrolysis or incineration in a fluidized bed reactor.

BRIEF SUMMARY

These and other objects may be accomplished as follows. In a preferred practice of the invention, a polymer-containing waste material such as dried paint sludge is continuously delivered to a fluidized bed reactor in particulate form. The reactor comprises a chamber in which a bed of inert refractory particles is continuously agitated by hot gases admitted through the bottom of the reactor to form a fluidized bed. The bed is initially heated to a temperature above the degradation temperature of the ploymer particles.

Once disposed in the bed, the polymer particles aggregate with the refractory particles. The flow of fluidizing gas is related to assure that the aggregate particles are suspended and agitated within the bed. At the elevated operating temperature of the reactor, any polymer therein degrades either by pyrolysis (in the absence of oxygen) or incineration (in the presence of oxygen). The pyrolysis reaction is endothermic and may yield reaction products (such as free monomer) that can be collected and recycled. Incineration, on the other hand, is exothermic and releases substantial amounts of heat energy. Because of the agitation of the bed, this heat is evenly redistributed providing enough energy to raise the temperature of added polymeric particles. Excess heat energy is preferably recovered by heat exchanging means disposed within the reactor. This recovered heat may be used, as desired, for such purposes as heating water or drying raw paint sludge.

The rates of introduction of polymer waste and oxygen during incineration and the removal of heat are regulated to operate the reactor under substantially steady state conditions.

An important feature of the subject invention is the provision of means for creating a toroidal flow pattern of particles in the fluidized reactor bed. This was accomplished by means of a novel perforated plate located at the bottom of the reactor for admitting fluidizing gases. The perforation density of the plate is substantially higher near the center to preferentially accelerate the carrier and waste particles in the center of the bed. These particles ascend from the bed center, flow in a radially outward direction at the top of the bed and then descend along the reactor chamber walls. This motion provides for rapid heating of newly introduced particles, controlled agglomeration of the bed particles and the polymeric feed stock, and the maintenance of fairly constant temperatures within the bed.

The reaction products of pyrolyzed and burned polymers generally consist of hot gases and small particulates. These may be collected by such conventional means as electronic precipitation, cyclone separation and spray condensation.

I have found that processing highly pigmented automotive acrylic paint sludge in a reactor in accordance with the invention reduces its bulk by approximatley 10:1 and generates approximately 2500 kilo-calories of heat per pound of dry sludge. Much of the residue is noncumbustible pigment recovered primarily in the form of metal oxides. Accordingly, the disposal of polymeric waste by the practice of my invention realizes substantial cost savings over solid waste disposal and also generates useful heat energy or recyclable by-products.

DETAILED DESCRIPTION

My invention will be better understood in view of the Figures and detailed description which follows.

In a preferred practice of the invention, waste material made up at least in part of a meltable thermoplastic polymer is processed in a fluidized bed reactor to reduce its bulk and recover heat energy. While the invention relates specifically to processing polymers which would otherwise melt and clog conventional incinerators and fluidized bed reactors, the subject apparatus could be used to process other more easily handled materials such as thermosetting polymers, natural organic matter or carbon based fuels.

The subject method is particularly adapted to processing paint sludge. Paint sludge is the residue formed by the agglomeration of water or solvent based paint overspray in cascade spray booths. The sludge is generally saturated with water as formed, but is dehydrated, compressed and curshed to particles of varying sizes before its introduction into the subject fluidized bed reactors. I have found that the use of powdered sludge (less than 2 mm particle diameter) alone may cause too rapid an exothermic reaction. On the other hand, when all larger sized particles are introduced (greater than 5 mm particle diameter), the induction time to a self-sustaining reaction may take several minutes. Use of paint sludge crushed to yield a cross section of particle sizes in the range of from about 1 mm to 10 mm provides for smooth and instantaneous burning in a sutiable fluidized bed reactor. Accordingly, it is preferred to prepare thermoplastic waste by comminuting it to particles of mixed sizes prior to burning or pyrolysis in accordance with the method and means claimed herein. The maximum desirable particle size would be a function of the size and operating parameters of the reactor used, and would be readily determinable by one skilled in the art.

Automotive paint finishes are generally comprised, at least in part, of thermoplastic acrylic resin. Acrylic resins may be thermally degraded by two reaction mechanisms. First, they may be heated to a high temperature in the absence of oxygen. This process causes pyrolysis of the polymer. In pyrolysis, the polymerized acrylates are broken up yielding a substantial portion of methyl-methacrylate monomer, other short chain carbon constituents and heat. The other relevant reaction mechanism for acrylate degradation is combustion in the presence of oxygen, also referred to herein as incineration or burning. It is believed that in the subject incineration process, pyrolysis first takes place and thereafter the pyrolysis products burn with oxygen to yield reaction products including carbon dioxide, water and heat.

Figure 1:
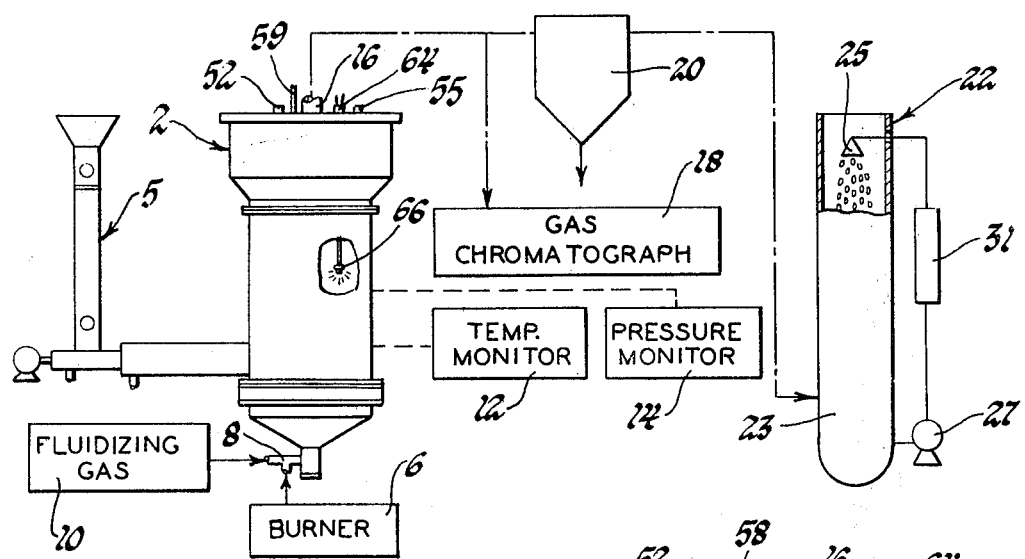
FIG. 1 is a schematic diagram of a fluidized bed reactor system for pyrolyzing or burning particulate thermoplastic materials.

FIG. 1 is a schematic representation of a system particularly adapted for pyrolyzing or burning ground thermoplastic acrylic paint sludge, one of the most difficult polymer waste disposal problems. At the heart of the system is a fluidized bed reactor 2 which is shown in greater detail at FIG. 2. Particulate thermoplastic waste is introduced at a location near the bottom of the reactor by means of a feed mechanism 5 shown in greater detail at FIG. 5.

Prior to introducing thermoplastic waste particles into reactor 2, reaction chamber 4 (FIG. 2) and particle bed 7 are heated to a temperature sufficient to initiate the desired degradation reaction. Heating is initially accomplished by means of gas burner 6. Hot gases from burner 6 are directed through a branched pipe fitting 8 near the bottom of reactor 2. A pressurized source 10 of a fluidizing gas is also provided. The fluidizing gas is also admitted through fitting 8, as necessary, to cause agitation and fluidization of the particle bed 7 within reactor 2. Bed 7 is shown at rest in FIG. 2. Temperature monitor 12 and pressure monitor 14 are connected to several probes in the reactor walls. The monitors are provided to closely monitor conditions within reaction chamber 4 so that operating conditions may be controlled to achieve peak efficiency.

The degradation reaction of thermoplastic waste in reactor 2 generally produces particulate and gaseous products. Some solid waste products are retained and carried in the fluidized bed during its operation. These are removed from the bottom of the reactor after a run. Gaseous products and fine particulates are continuously exhausted through an exit port 16 located at the top of reactor 2 while it operates. The composition of these products is determined by means of gas chromatograph 18 which analyzes samples intermittently withdrawn from reactor exhaust. Particulates are collected in cyclone separator 20. Very fine particulates and vapors are collected downstream of separator 20 in spray condenser 22.

Figure 2:
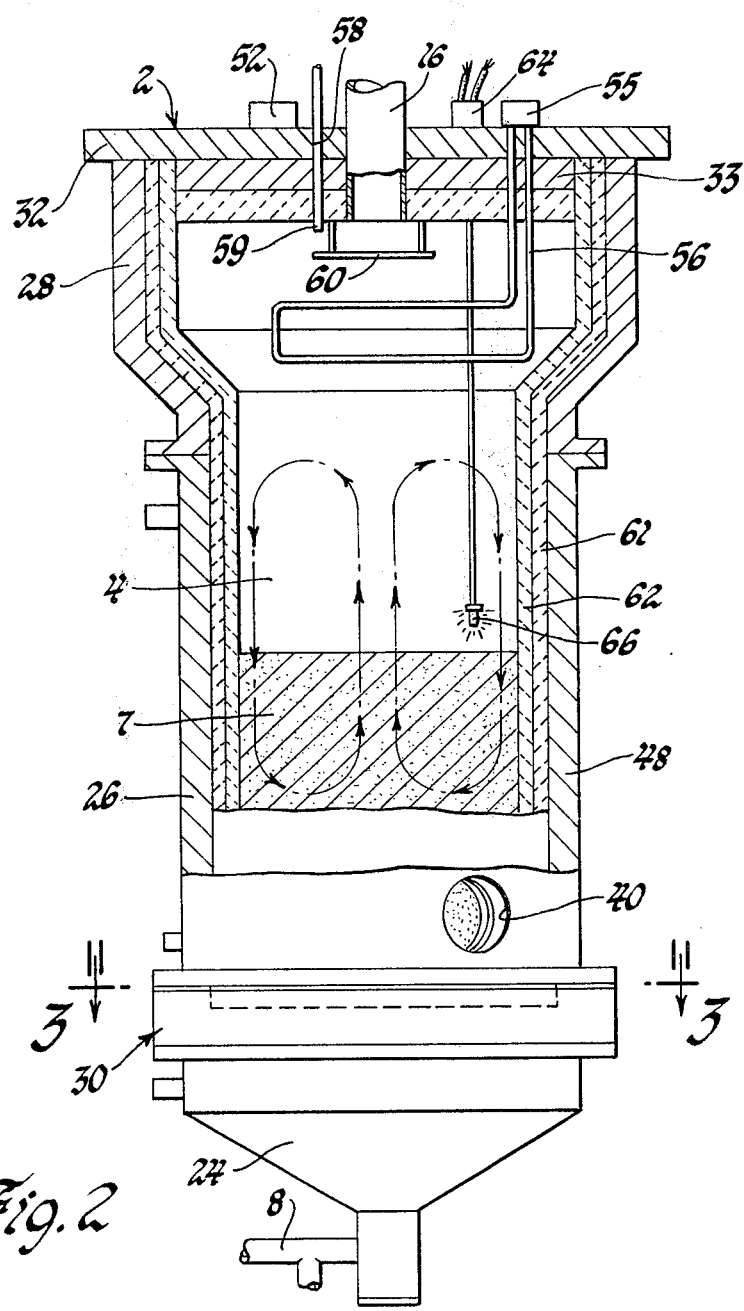
FIG. 2 is a sectional view of a fluidized bed reactor of the type suitable for the practice of the invention.

Referring now to FIG. 2, a reactor 2 in which paint sludge was burned as described and claimed herein is schematically shown in some detail. Reactor 2 is made up of three stacked sections: a plenum or wind box 24 at the bottom, reaction chamber housing 26 above plenum 24, and flue 28 above housing 26. A gas distributor or diffuser plate 30 is interposed between plenum 24 and housing 26, and cover 32 overlays flue section 28. The sections are secured together by means of bolts and gasket materials (not shown) to form airtight seals between the members.

Fluid flow in reactor 2 is generally upwards from bottom to top. Fluidizing and heating gases are introduced through fitting 8, distributed evenly through plenum 24 and then forced through distributor plate 30 into reaction chamber 4. Plenum 24 is shaped like an inverted funnel, opening up towards gas distributor plate 30. The flow rate of the gas through plate 30 is regulated to control the fluidization of bed 7.

Generally, 10 kilograms of 80 mesh white silica sand was introduced into chamber 4 to form particle bed 7 before each run. While sand is a preferred bed agent, other materials which would not interfere with the polymer degradation would also be suitable. For example, crushed limestone or even particles catalytic to the reaction could be used.

Figure 3:
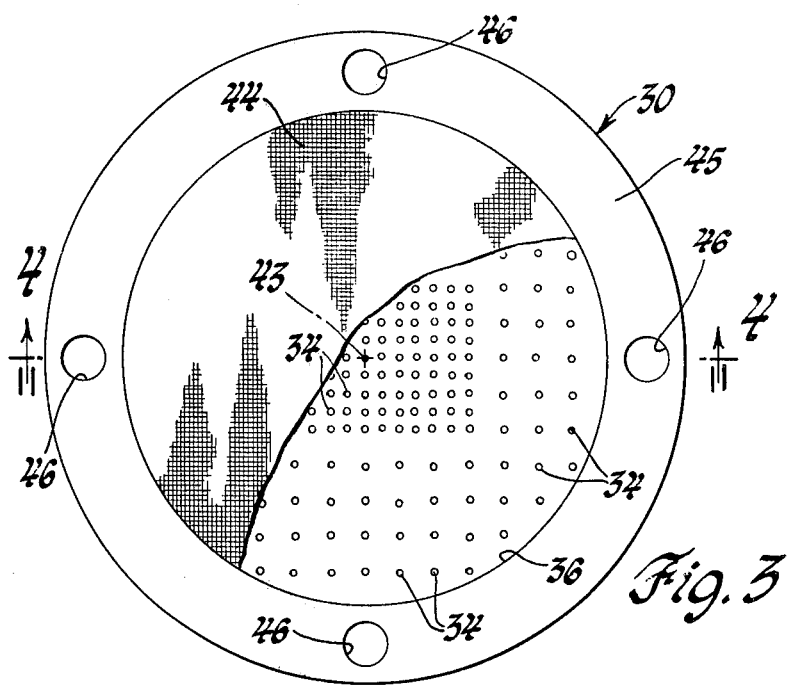
FIG. 3 is a broken away plan view of a distributor plate and screen through which pressurized gas is admitted into a fluidized bed reaction chamber.
Figure 4:
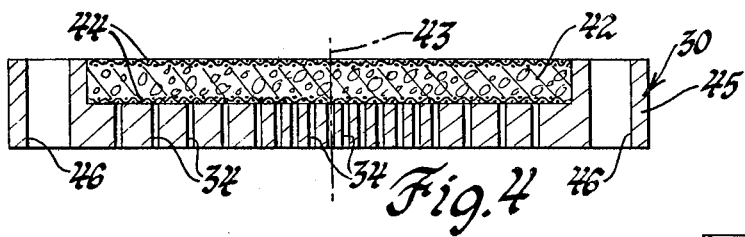
FIG. 4 is a sectional side view of the distributor plate and screen of FIG. 3.

Referring now to FIGS. 3 and 4, distributor plate 30, machined from 310 stainless steel, is 350 mm in diameter, 10.8 mm thick at the center 43 and 15.9 mm thick at flange 45. Holes 34 are provided in plate 30 to distribute air from plenum 24 into reaction chamber 4. Eight hundred and eighty one (881) holes, 1.5 mm in diameter each, were drilled through plate 30 in a pattern like that shown generally at FIG. 3. Substantially more holes 34 were drilled near the center 43 of plate 30 than near flange 45. Bolt holes 46 are provided in flange 45 for fastening housing 26, plate 30 and plenum 24 together.

Fluidization of refractory particle bed 7 in chamber 4 is caused by the flow of gas through holes 34. The arrangement of holes determines the path of particle flow in reaction chamber 4. The array of holes 34 in plate 30 of FIGS. 3 and 4 causes the particles to travel in a toroidal path from along the bottom of the bed towards the center, up the center of the toroid, across the top and then down the wall of the reactor back towards the bottom as indicated with broken lines at FIG. 2. Because of the cyclical motion of the particles of bed 7, when thermoplastic feed stock is introduced through inlet 40 in the reactor housing section 26, it is immediately carried to the bottom. Thereafter, the feed stock joins the toroidal flow path of the refractory particles. Thus, the use of a distributor plate as described assures that waste particles can be introduced into a fluidized bed reactor without creating localized cold spots which tend to melt the thermoplastic without substantial instantaneous degradation. The presence of cold spots can quench the degradation reaction and cause clogging of the reactor.

Again, referring to FIG. 4, a disc 42 of metallic foam (80% Co, 10% Cr alloy) is disposed in a circular groove in the top of distributor plate 30. Foam disc 42 mediates the flow of pressurized gas through holes 34 without affecting the flow path of particles in the fluidized bed. It also acts as a fail safe to prevent any fugitive melted plastic or particulate of bed 7 from clogging holes 34. Because this metal foam is fragile, it is sandwiched between two layers 44 of fine mesh stainless steel wire cloth.

Referring again to FIG. 2, outer wall 48 of chamber section 26 is a tubular stainless steel structure having a right circular cylindrical shape. The chamber is 533 mm high with an outside diameter of 280 mm and an inside diameter of 203 mm. Six heating coils (not shown) are provided around outer wall 48 for initially elevating its temperature to prevent substantial heat loss from reaction chamber 4. During operation, the fluidized bed is substantially confined to reactor section 26.

Flue section 28 has an outer wall 29 made of stainless steel which is positioned above reaction chamber section 26. It tapers outwardly from the size of housing 26 to a larger outside diameter of 432 mm. Flue 28 is 300 mm high. On the top of flue section 28, a 13 mm thick cover plate 32 is provided with a positioning insert disc 33 and insulating layer 35.

Cover 32 has several ports therethrough, the largest of these (in diameter) is located in the center as an outlet 16 for gaseous and fine particulate reaction products. Covered access door 52 was provided for introducing particles to refractory bed 7. A sealed portal 55 was provided for accommodating heat exchanger 56. A small port 58 was provided for gas sampling line 59 to the gas chromatograph.

Sealed port 64 was provided for electrical connections 63 to glow plug 66. Glow plug 66 was situated inside the reactor 4 a few centimeters above static bed 7. Glow plugs are well known for use in localized heating applications. See, for example, U.S. Pat. No. 4,112,577 assigned to the assignee hereof. Glow plugs are generally known in the electrical heater art to comprise a closed end tubular protective metal ignition source, any other ignition source which can be operated at a temperature above the combustion temperature of the material to be burned in the reactor would be suitable.

The point ignition source (glow plug 66) operates to continuously ignite at least the portion of scrap material adjacent to it. This ignited material is then rapidly carried through the reactor by the action of the fluidized bed.

Thus, inclusion of a point ignition source serves to prevent the accumulation of combustible and potentially explosive gases in the reactor. It further serves to prevent auto-extinction of a burning reaction, particularly if the reactor temperature is allowed to fall to a temperature close to the minimum temperature at which the burning reaction is self-sustaining. The ignition source also initiates the polymer burning reaction in a fluidized bed reactor at a temperature substantially lower than the auto-ignition temperature of the polymer constituents therein.

A baffle 60 is disposed beneath outlet 16 of flue 28 to prevent the passage of large particles from the reactor. Housing 26 and flue 28 are lined with 25 mm thick layer 62 of cast and dried refractory. A refractory blanket 61 was inserted between housing outer wall 48, flue wall 29 and refractory line 62 for further insulation value. Obviously, the amount of heat recoverable from exothermic burning of polymers is a function of heat loss from the reactor. Therefore, improved insulation can improve heat recovery.

The temperature of the fluidized bed reactor and heated sampling line were measured with Chromel-Alumel thermocouples. The temperatures were displayed on a 0°-2000° F. range Leads and Northrup digital readout thermometer. Thermocouple ports (not shown) were provided in the reactor walls at vertical separation distances of about 150 mm.

Figure 5:
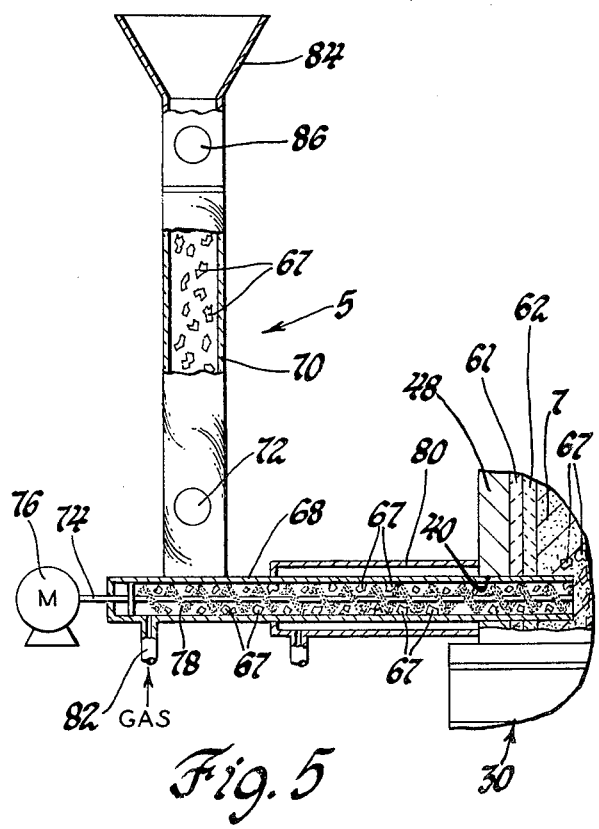
FIG. 5 is a sectional view of a brush screw feeder suitable for introducing thermoplastic materials into an operating fluidized bed reactor.

Referring now to FIG. 5, a feeder substantially like that which I employed for delivering thermoplastic particles to be burned or pyrolyzed in the fluidized bed reactor is shown in more detail. The feeder barrel 68 for thermoplastic particles 67 enters the reaction chamber 4 through a 76 mm flanged opening 40 located about 25 mm above gas distribution plate 30. Feeder barrel 68 extends about 25 mm through opening 40 in wall 48 of housing 26 and into the fluidized bed. Prior to delivery, waste particles 67 are retained in an 800 mm high, 75 mm diameter acrylic hopper 70. This allowed visual metering of the particle flow through feed value 72 into feed barrel 68. Particles are introduced into hopper 70 through chute 84 with valve 86 open. Valve 86 is closed while particles 67 are fed to the reactor.

Particles 67 are conveyed through feed barrel 68 by rotation of shaft 74 driven by a motor 76, shaft 74 carrying a plurality of helically mounted stainless steel bristles 78. Unlike a rigid screw feeder, the bristles bend and slip by small obstructions in the barrel wall reducing torque on shaft 74 and abrasion between the brush flights and the feeder barrel. Water jacket 80 is provided around barrel 68 to cool it and help prevent any polymer from melting before it reaches the fluidized bed. An air inlet 82 is located at the end of feeder barrel 68 remote from reactor 2. The air is admitted at a rate to keep the feed stock particles 67 mobile and unmelted while in barrel 68. The air pressure in the feed tube must be greater than reactor pressure to prevent backflow of hot reactor gases. If the particles are to be degraded by hydrolysis, it is preferable to use an inert carrier gas such as nitrogen in the feed tube 68.

Most of the fine particulate pyrolysis and incineration products (about 10 mesh or smaller) were collected in a cyclone separator about 120 mm in diameter and 220 mm high. Referring back to FIG. 1, exhaust gases from cyclone separator 20 and very fine particulates were trapped in a conventional spray condenser 22. The condenser column 23 is 152 cm long and 15 cm in diameter. Water from sprayer 25 washes the incoming gases. Condensation from near the bottom of column 23 is recirculated to sprayer 25 by pump 27 through heat exchanger 31.

Exhaust gas was intermittently sampled through tube 58 and analyzed by a Hewlett-Packard 5840A Reporting ® gas chromatograph. The chromatograph was programmed for automatic analysis of volatile products and out of the results. The Hewlett-Packard chromatograph has two 10 ft by ⅛" columns: one 5% Dexil 300 on 60/80 mesh Chromosorb-W and one 10% Dexil 300 on 80/100 mesh Chromosorb-W. Line 58 from reactor 2 and the chromatograph were heated. A vacuum was drawn on line 58 to withdraw gaseous products from the reactor to the chromatograph. Consequently, the chromatograph was able to analyze the gaseous products "on line" according to a preset operating time sequence.

The general procedure for operating the reactor described above and diagrammed in FIG. 1 is as follows. First, a suitable amount of refractory particles is charged into reaction chamber 4 to form a bed 7. These particles do not degrade at reactor operating temperatures nor do they interfere with the degradation reactions. The scrap 67 to be processed is disposed in hopper 70. All the temperature and pressure signal devices, cyclone separator 20, and spray condenser 22 are activated and ignition source glow plug 66 is turned on. The gas chromatograph system 18 is activated for on-line analysis of exhaust. Cooling water is run through feeder band jacket 80.

Thereafter, reactor 2 is heated to a temperature selected for a run by burner 6 and the six band heaters (not shown) around housing 26 are turned on.

Fluidizing gas is introduced into reactor 2 at a rate to maintain good fluidization of particle bed 7. If the scrap is to be burned rather than pyrolyzed, enough air is introduced to the preheated bed through fitting 8 to achieve an oxygen level adequate to support complete combustion. The system is then allowed to come to equilibrium characterized by a constant temperature within the bed.

At this point, scrap material is continuously introduced into the hot fluidized bed reactor via feeder mechanism 5. Once combustion is well under way, burner 6 and the band heaters are turned off. Once the self sustaining reaction is achieved, the intensity of combustion is controlled by varying the feed rate of the scrap material and the air flow rate in the reactor. Excess heat is removed through heat exchanger 56. Reactor 2 is shut down by reversing the process set forth above.

In general, the heat liberated by a burning reaction in the fluidized bed must be greater than or at least equal to the heat lost from the system by, e.g., discharge of reaction products and radiation from the reactor. By experimentation I have determined that with adequate reactor insulation, bed temperature and air velocity therein are two variables which have significant effect on the steady-state operation of the subject fluidized bed reactors.

Figure 6:
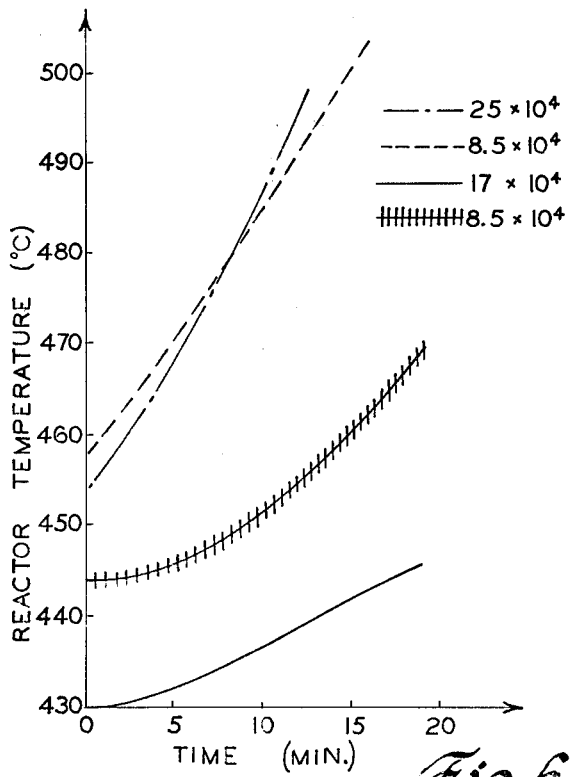
FIG. 6 is a plot of reactor temperature as a function of time for the incineration of a kilogram of acrylic paint sludge at several different fluidizing air flow rates.

Referring to FIG. 6, Reactor Temperature versus Time is plotted for the incineration of one kilogram of automotive acrylic lacquer sludge at several different fluidizing air velocities. While there is considerable variation in the composition of such sludge, that used for my experiments had an approximate weight assay of about 66.5% acrylic resin based on poly(methyl methacrylate), 32 percent pigments (primarily metal oxides), 1 percent aluminum and 0.5% coagulants. The air flow rates of FIG. 6 are listed adjacent corresponding line legends and are in units of $cm^3$/min Air.

Looking at the curve for an air flow rate of $17 \times 10^4$ $cm^3$/min at room temperature, it is clear that at too low an initial reactor temperature (here about 430° C.) that even a relatively high air flow rate will not promote a high rate of incineration of the paint sludge.

However, above a critical temperature of about 440° C., even a relatively low air flow rate will sustain burning of acrylic paint sludge. This is indicated by a significant elevation in reactor temperature with time as plotted in FIG. 6. Thus, at an air velocity of 8.5 $cm^3$/min at an initial reactor temperature of about 443° C., a sludge burning reaction is promoted and sustained.

The plot of FIG. 6 also indicates that at an initial temperature above about 450° C., reactor temperature rises relatively rapidly. This rise is about the same for air inlet flow rate of both $8.5 \times 10^4$ $cm^3$/min and $25 \times 10^4$ $cm^3$/min. This suggests that if the burning reaction within a fluidized bed reactor has a sufficient supply of oxygen and is operating above the critical ignition temperature for the feedstock, the effect of air flow rate on the reaction is not significant.

For burning one kilogram of the automotive lacquer sludge, it is clear that an initial temperature of 430° C. is somewhat low. Similarly, a starting temperature of about 445° C. does not initially promote rapid temperature rise in a reactor. However, an initial reactor temperature of about 453° C. and higher promotes rapid reactor temperature rise, indicative of efficient burning of the paint sludge. Such critical temperatures for other polymeric feedstocks can readily be determined by one skilled in the art and the fluidized bed reactor operated accordingly.

My invention is further defined in terms of the following Example.

EXAMPLE

A series of tests was conducted to investigate the self-sustaining incineration of automotive acrylic lacquer, solventborne acrylic enamel and waterborne acrylic paint. All contained about 65-70 weight percent poly(methyl methacrylate) with the balance being inorganic pigments and traces of other organic constituents. One kilogram of sludge predried at about 95° C. was burned per run.

The apparatus used was that described above including the fluidized bed reactor with specially adapted diffuser plate, the brush screw feeder, the exhaust treatment system, the measurement devices and all other peripheral devices. Incineration was generally carried out at one atmosphere gage pressure at a steady state reactor temperature of about 1000° C. Fluidizing air velocity through the diffuser plate was maintained at approximately 340 liters per minute. These conditions were selected to insure an adequate supply of oxygen for combustion (approximately 17% excess oxygen). The glow plug in the reactor chamber was operated continuously to assure constant ignition of the thermoplastic sludge.

More than 98.4 weight percent of the organics in the paint sludge burned at a rate of approximately 38.6 grams per minute. The sludge was introduced through the feeder tube at the same rate. The total energy released during combustion of each 2.28 kg of sludge was calculated to be approximately 13,000 kilocalories. About 0.6 kg of noncombustible solids remained in the bed material as residue. Spectrographic analysis of the residue, reported in Table I indicated that the residue consisted mostly of inorganic metal oxides. Most of the solid reaction products were removed from the exhaust gases of the reactor in the cyclone separator and spray condenser.

TABLE I

| | Spectrographic Analysis of Bed Residue* Element in Each Type of Paint Sludge (%) | | |
|---|---|---|---|
| Element | Acrylic Lacquer | Solventborne Enamel | Waterborne Enamel |
| Ti | 5 | 4 | 4 |
| Fe | 4 | 4 | 4 |
| Al | 10 | 10 | 10 |
| Si | 10 | 10 | 10 |
| Mg | 0.1 | 0.1 | 3 |
| Pb | 1 | 5 | 0.05 |
| Ni | 0.05 | 0.1 | 0.02 |
| Cu | 0.1 | 0.1 | 0.1 |
| Ca | 0.1 | 0.5 | 0.3 |
| Cr | 0.1 | 0.5 | 0.02 |
| Na | 0.1 | 0.5 | 0.1 |

*These are semi-quantitative estimates, reported in percent of sample. The actual values are expected to be within one-third to three times the reported values.

On the basis of these runs, I have found that incineration of dried paint sludge in accordance with this invention achieves the following desirable results. First, the volume of the paint sludge is reduced from about one tenth to one twentieth of its initial volume depending on initial water and pigment content of the sludge. A substantial amount of heat, approximately 6,000 kilocalories per kilogram, is generated by the combustion reaction and depending on the heat losses from the reactor, a substantial amount of this energy can be recovered for useful purposes. Moreover, the sludge undergoes almost complete oxidation of combustible components, and the noncombustible residue is relatively easy to dispose of.

In summary, paint sludge or other polymeric scrap materials, including thermoplastics, can be effectively incinerated in my novel fluidized bed reactor. Virtually all the organics burn with only a relatively small volume of inorganic residue remaining. Excess heat can be recovered for useful purposes.

While my invention has been described in terms of specific embodiments thereof, clearly other forms may be readily adapted by one skilled in the art. Accordingly, my invention is to be limited only by the following claims.

The embodiments of the invention in which an exclusive property or privilege is claimed are defined as follows:

1. A method of pyrolyzing paint sludge having a thermoplastic constituent to recover recyclable pyrolysis products comprising the steps of:

drying said sludge to remove fugitive water;

comminuting said sludge to particles sized to be readily suspendable in a fluidized bed;

providing a bed of refractory particles in a fluidized bed reactor and means for fluidizing the bed by directed flow of pressurized gas;

initially heating said reactor bed to a temperature above the pyrolysis reaction temperature of the sludge particles;

conveying said sludge particles from a remote source thereof to an inlet near the bottom of said reactor without any substantial melting of the particles before they enter the reactor bed;

dispensing said sludge particles into said reactor bed while it is in a fluidized state such that the paint sludge particles are carried with the refractory particles and are rapidly heated to their pyrolysis temperature without clogging the reactor; and removing the pyrolysis products from the top of the reactor while adding heat and sludge particles near the bottom of the bed at a rate such that the reactor operates under substantially steady state conditions.

2. The method of claim 1 where the thermoplastic constituent of the paint sludge is poly(methyl methacrylate).

3. The method of claim 1 where the pressurized fluidizing gas is substantially oxygen free.

4. A method of pyrolyzing thermoplastic polymer-containing waste particles to reduce their bulk and recover chemical constituents therefrom comprising the steps of fluidizing a bed of refractory particles in a reactor chamber by the directed flow of a fluidizing gas therein, initially heating said fluidized refractory bed to a temperature above the pyrolysis temperature of the thermoplastic polymer constituent of the waste particles, dispensing the waste particles into the reactor chamber while the refractory particles are in a fluidized state such that the waste particles are carried with the refractory particles and are rapidly heated to an elevated temperature at which the polymer degrades without clogging the reactor, removing the pyrolysis reaction products from the reactor, and introducing additional waste particles to the reactor chamber and regulating the temperature of the fluidized bed such that the reactor operates under substantially steady state conditions.

5. The method of claim 4 where a said reaction product is methyl methacrylate monomer.

6. A reactor for burning polymeric waste particles on a continuous, self-sustaining basis by injecting them into a bed of fluidized refractory particles at a bed temperature above their degradation reaction temperature, the reactor comprising a reaction chamber having a substantially right circular cylindrical shape and diffuser means for directing gas into said chamber under pressure to fluidize the refractory and waste particles, the diffuser means comprising an air impervious plate located at the bottom of the chamber in sealing relationship with the chamber walls, said plate having a plurality of small holes for admitting said gas into said chamber, wherein said holes are arranged such that there is a high density of holes in the plate center and a diminishing hole density in a radially outward direction from the plate center such that flowing gas through said holes upwardly through said chamber creates a relatively high pressure zone in the center of the reaction chamber and a relatively low pressure zone adjacent the chamber walls, the pressure differential causing the particles suspended in the fluidized bed to continuously travel in a toroidal path upwardly from the center of the reaction chamber and then down the reaction chamber walls and a metallic foam disc located above said plate to mediate the flow of pressurized gas from the plate therethrough and into the chamber thereby preventing any fugitive melted polymeric waste from clogging the said small holes in the plate.

7. The reactor of claim 6 wherein a heat resistant screen is located on either side of said metallic foam disc.

* * * * *